(12) United States Patent
Jung et al.

(10) Patent No.: US 9,948,748 B2
(45) Date of Patent: Apr. 17, 2018

(54) METHOD OF RECEIVING/TRANSMITTING EVENT MESSAGE, CONTROLLED DEVICE, AND CONTROL POINT

(75) Inventors: Dong-shin Jung, Suwon-si (KR); Joo-yeol Lee, Seoul (KR); Kiran Bharadwaj Vedula, Karnataka (IN); Subramanian Krishnamoorthy, Karnataka (IN); Sreekanth Siddapur Channakeshava, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1267 days.

(21) Appl. No.: 12/144,037

(22) Filed: Jun. 23, 2008

(65) Prior Publication Data

US 2008/0320469 A1 Dec. 25, 2008

Related U.S. Application Data

(60) Provisional application No. 60/945,623, filed on Jun. 22, 2007, provisional application No. 60/945,697, filed on Jun. 22, 2007.

(30) Foreign Application Priority Data

Feb. 12, 2008 (KR) .................. 10-2008-0012614
Apr. 10, 2008 (KR) .................. 10-2008-0033357

(51) Int. Cl.
*G06F 9/44* (2006.01)
*G06F 9/45* (2006.01)
(Continued)

(52) U.S. Cl.
CPC .......... *H04L 67/34* (2013.01); *H04L 12/2814* (2013.01); *G06F 8/60* (2013.01); *G06F 8/61* (2013.01)

(58) Field of Classification Search
CPC .......... G06F 9/44505; G06F 8/60–8/65; H04L 29/08981; H04L 67/34; H04L 12/2814
(Continued)

(56) References Cited

U.S. PATENT DOCUMENTS 6,480,901 B1 * 11/2002 Weber et al. .................. 709/246
6,725,281 B1 * 4/2004 Zintel et al. .................. 719/318
(Continued)

FOREIGN PATENT DOCUMENTS

CN 1516008 A 7/2004
CN 1663191 A 8/2005
(Continued)

OTHER PUBLICATIONS

Junzhong Gu, Intelligent Home—Enjoying Computing Anywhere, pp. 310-319 (Year: 2005).*
(Continued)

*Primary Examiner* — Thuy Dao
*Assistant Examiner* — Mongbao Nguyen
(74) *Attorney, Agent, or Firm* — Sughrue Mion, PLLC

(57) ABSTRACT

A selective event message receiving method is provided, in which an application is installed in a controlled device (CD) by using a network, a start message which includes a parameter specifying at least one service included in the application and requests a start of the application is transmitted to the CD, and an event message that represents a state change of the at least one service specified by the parameter is received from the CD. Accordingly, the application can be efficiently managed by selectively recognizing state changes of some services of interest from among the services included in the application.

38 Claims, 11 Drawing Sheets

(51) Int. Cl.
  *G06F 9/445* (2006.01)
  *H04L 29/08* (2006.01)
  *H04L 12/28* (2006.01)

(58) Field of Classification Search
  USPC .......................................... 717/168, 174–178
  See application file for complete search history.

(56) References Cited

U.S. PATENT DOCUMENTS

| | | | |
|---|---|---|---|
| 6,892,230 B1 | 5/2005 | Gu et al. | |
| 6,917,976 B1* | 7/2005 | Slaughter | G06F 9/465 707/999.009 |
| 6,918,084 B1* | 7/2005 | Slaughter | G06Q 30/02 709/217 |
| 7,017,148 B2* | 3/2006 | Kumar | 717/114 |
| 7,213,061 B1* | 5/2007 | Hite | H04L 12/2803 361/803 |
| 7,240,324 B2* | 7/2007 | Casati | G06F 8/10 709/248 |
| 7,313,120 B2* | 12/2007 | Ekberg | H04W 48/14 370/338 |
| 7,340,531 B2* | 3/2008 | Rasheed | H04L 67/322 707/999.01 |
| 7,355,988 B1* | 4/2008 | Denbar et al. | 370/282 |
| 7,664,135 B2* | 2/2010 | Oshima | H04N 5/765 370/389 |
| 7,996,493 B2* | 8/2011 | Hill | G06F 9/544 709/218 |
| 8,005,915 B2* | 8/2011 | Jeon | H04L 67/06 709/208 |
| 8,081,596 B1* | 12/2011 | Buracchini et al. | 370/328 |
| 8,135,796 B1* | 3/2012 | Slaughter | G06F 9/465 709/217 |
| 8,707,295 B2 | 4/2014 | Yook | |
| 8,782,635 B2* | 7/2014 | Burke et al. | 717/174 |
| 9,037,685 B2* | 5/2015 | Welingkar | G06F 17/30575 709/219 |
| 2002/0049049 A1* | 4/2002 | Sandahl et al. | 455/414 |
| 2002/0124064 A1* | 9/2002 | Epstein et al. | 709/221 |
| 2003/0174162 A1* | 9/2003 | Wu | 345/736 |
| 2003/0217136 A1 | 11/2003 | Cho et al. | |
| 2003/0220872 A1* | 11/2003 | Chandrashekhar | G06Q 20/102 705/40 |
| 2004/0136713 A1* | 7/2004 | Lim | H04L 1/243 398/66 |
| 2004/0139177 A1 | 7/2004 | Yook | |
| 2004/0185837 A1* | 9/2004 | Kim et al. | 455/414.3 |
| 2004/0216099 A1* | 10/2004 | Okita et al. | 717/168 |
| 2004/0221007 A1* | 11/2004 | Roe | H04L 29/06 709/203 |
| 2004/0243994 A1* | 12/2004 | Nasu | 717/171 |
| 2005/0096051 A1* | 5/2005 | Lee et al. | 455/438 |
| 2006/0030308 A1* | 2/2006 | Okita et al. | 455/420 |
| 2006/0031498 A1* | 2/2006 | Kinugawa | G06Q 10/02 709/225 |
| 2006/0031828 A1* | 2/2006 | Won et al. | 717/168 |
| 2006/0037036 A1 | 2/2006 | Min et al. | |
| 2006/0041924 A1* | 2/2006 | Bushmitch et al. | 725/132 |
| 2006/0129283 A1* | 6/2006 | Alewine | G07C 5/008 701/1 |
| 2007/0055970 A1* | 3/2007 | Sakuda | G06F 8/65 717/168 |
| 2007/0074201 A1* | 3/2007 | Lee | 717/173 |
| 2007/0082681 A1* | 4/2007 | Kim et al. | 455/456.1 |
| 2007/0165265 A1* | 7/2007 | Ito et al. | 358/1.15 |
| 2007/0192462 A1* | 8/2007 | Bae | H04L 12/2809 709/223 |
| 2007/0224982 A1* | 9/2007 | Jeon | H04M 1/7253 455/419 |
| 2008/0130639 A1* | 6/2008 | Costa-Requena et al. | 370/389 |
| 2015/0113066 A1* | 4/2015 | Austin-Lane | G06Q 30/02 709/204 |

FOREIGN PATENT DOCUMENTS

| | | |
|---|---|---|
| FR | 2 891 972 A1 | 4/2007 |
| JP | 2007-156994 A | 6/2007 |
| KR | 10-2006-0013114 A | 2/2006 |
| WO | 2004008694 A1 | 1/2004 |
| WO | 2007/066843 A1 | 6/2007 |

OTHER PUBLICATIONS

Amos Albert, Comparison of Event-Triggered and Time-Triggered Concepts with Regard to Distributed Control Systems, pp. 235-252 (Year: 2004).*

Communication dated Aug. 1, 2012, issued by the State Intellectual Property Office for the People's Republic of China in counterpart Chinese Patent Application No. 200880103931.7.

Communication dated May 6, 2013 issued by the State Intellectual Property Office of P.R. China in counterpart Chinese Patent Application No. 200880103931.7.

Communication, dated Aug. 19, 2013, issued by the European Patent Office in counterpart European Patent Application No. 08766388.6.

Communication, dated Dec. 13, 2013, issued by the Korean Intellectual Property Office in counterpart Korean Application No. 10-2008-003357.

Communication dated Apr. 30, 2014, issued by the State Intellectual Property Office of the People's Republic of China in counterpart Chinese Application No. 201210201465.4.

Communication dated Jun. 12, 2014, issued by the State Intellectual Property Office of the People's Republic of China in counterpart Chinese Application No. 201210202028.4.

Communication dated May 15, 2014, issued by the European Patent Office in counterpart European Application No. 08766388.6.

Communication dated Apr. 27, 2015, issued by the State Intellectual Property Office of the People's Republic of China in counterpart Chinese Application No. 201210201465.4.

* cited by examiner

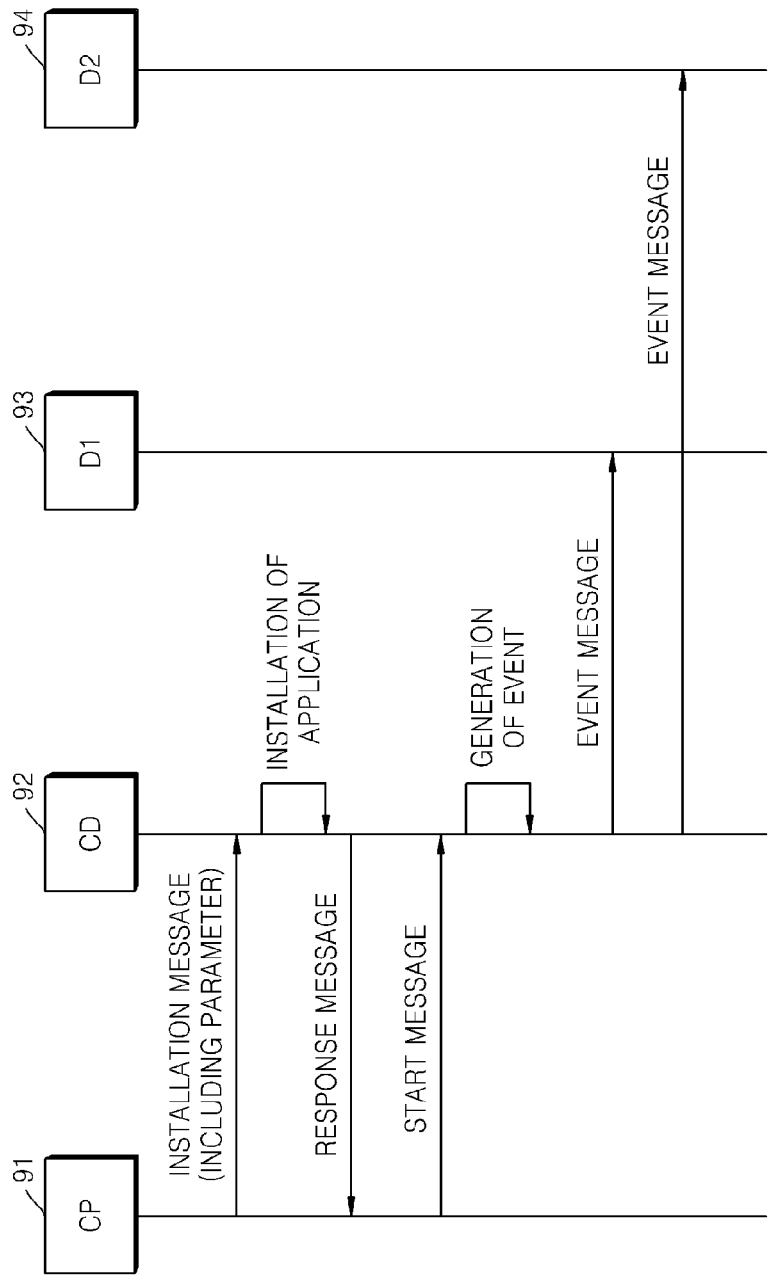

FIG. 11A

SUBSCRIBE publisher path HTTP 1.1
HOST: Publisher host: Publisher Port
CALLBACK: <delivery_URL>
NT: upnp:event
TIMEOUT: Second-Requested subscription duration

FIG. 11B

SUBSCRIBE publisher path HTTP 1.1
HOST: Publisher host: Publisher Port
CALLBACK: <url1,url2,url3>
NT: upnp:event
TIMEOUT: Second-Requested subscription duration

FIG. 11C

SUBSCRIBE publisher path HTTP 1.1
HOST: Publisher host: Publisher Port
CALLBACK: <url1,url2, url3, url4, url5>
NT: upnp:event
TIMEOUT: Second-Requested subscription duration

METHOD OF RECEIVING/TRANSMITTING EVENT MESSAGE, CONTROLLED DEVICE, AND CONTROL POINT

CROSS-REFERENCE TO RELATED PATENT APPLICATION

This application claims the benefits of U.S. Provisional Patent Application No. 60/945,623, filed on Jun. 22, 2007, and U.S. Provisional Patent Application No. 60/945,697, filed on Jun. 22, 2007, in the U.S. Patent and Trademark Office, and the benefits of Korean Patent Application No. 10-2008-0012614, filed on Feb. 12, 2008, and Korean Patent Application No. 10-2008-0033357, filed on Apr. 10, 2008, in the Korean Intellectual Property Office, the disclosures of which are incorporated herein in their entirety by reference.

BACKGROUND OF THE INVENTION

1. Field of the Invention

Methods and apparatuses consistent with the present invention relate to a home network, and more particularly, to a Universal Plug and Play (UPnP) based event message transmitting method, a UPnP-based event message receiving method, a controlled device, and a control point.

2. Description of the Related Art

Generally, a home network is a private network based on an Internet Protocol (IP), which networks all types of personal computers (PCs) and various apparatuses, such as intelligent products, wireless devices, etc., used in a house, via a common virtual computing environment called middleware, and controls them.

Middleware connects various digital apparatuses together on a peer-to-peer basis in order to allow communication between the digital apparatuses. Home Audio Video Interoperability (HAVI), Universal Plug and Play (UPnP) control devices, Java Intelligent Network Infra-structure (Jini), Home Wide Web (HWW), etc. have been currently proposed as examples of middleware.

Although a current operating system makes it much easier to install and set PC peripheral devices since it includes a Plug and Play (PnP) function, UPnP technology enables network devices, such as various home appliances, network printers, and Internet gates, to be networked, particularly, home networked, by extending this convenient PnP function to all types of networks on the basis of an Internet standard technology such as Transmission Control Protocol/Internet Protocol (TCP/IP), Hypertext Transfer Protocol (HTTP), and Extensible Markup Language (XML).

SUMMARY OF THE INVENTION

The present invention provides a method of receiving an event message for only some services included in an application installed in a controlled device (CD), a computer readable recording medium having recorded thereon a program for executing the method, and a control point (CP).

The present invention also provides a method of transmitting an event message for only some services included in an application installed in a CD, a computer readable recording medium having recorded thereon a program for executing the method, and the CP.

The present invention also provides a method of receiving an event message from a CD without needing to send an event subscription call when an application included in a separate device is installed in the CD, a computer readable recording medium having recorded thereon a program for executing the method, and a CP.

The present invention also provides a method of transmitting an event message to a CP without needing to receive an event subscription call when an application included in a separate device is installed in a CD, a computer readable recording medium having recorded thereon a program for executing the method, and the CD.

The present invention also provides a method of transmitting event messages to a plurality of devices desiring to receive the event message, in parallel, and a computer readable recording medium having recorded thereon a program for executing the method.

According to an aspect of the present invention, there is provided an event message receiving method comprising: installing an application in a controlled device via a network; transmitting to the controlled device, a first message that comprises a parameter specifying at least one of services included in the application, and requests the application to start; and receiving a second message that represents a state change of the at least one service specified by the parameter, from the controlled device.

According to another aspect of the present invention, there is provided a computer readable recording medium having recorded thereon a program for executing a second message receiving method comprising: installing an application in a controlled device via a network; transmitting to the controlled device, a first message that comprises a parameter specifying at least one of services included in the application, and requests the application to start; and receiving the second message that represents a state change of the at least one service specified by the parameter, from the controlled device.

According to another aspect of the present invention, there is provided an event message transmitting method comprising: installing an application received from a control point which controls a controlled device via a network, in the controlled device; receiving from the control point a first message that comprises a parameter specifying at least one of services included in the application and requests the application to start, and operating the application; and transmitting a second message that represents a state change of the at least one service specified by the parameter, to the control point.

According to another aspect of the present invention, there is provided a computer readable recording medium having recorded thereon a program for executing a second message transmitting method comprising: installing an application received from a control point which controls a controlled device via a network, in the controlled device; receiving a first message that comprises a parameter specifying at least one of services included in the application and requests the application to start, from the control point, and operating the application; and transmitting the second message that represents a state change of the at least one service specified by the parameter, to the control point.

According to another aspect of the present invention, there is provided an event message receiving method comprising: transmitting to the controlled device, a third message that requests a controlled device to install an application and comprises a parameter representing whether information about the application is of interest; receiving a fourth message comprising the information about the application according to the parameter, from the controlled device; transmitting a first message that requests the application to start, to the controlled device; and receiving a second message that represents a state change of the application, from the controlled device.

According to another aspect of the present invention, there is provided a computer readable recording medium having recorded thereon a program for an event message receiving method comprising: transmitting to the controlled device, a third message that requests a controlled device to install an application and comprises a parameter representing whether information about the application is of interest; receiving a fourth message comprising the information about the application according to the parameter, from the controlled device; transmitting a first message that requests the application to start, to the controlled device; and receiving the second message that represents a state change of the application, from the controlled device.

According to another aspect of the present invention, there is provided an event message transmitting method comprising: receiving a third message that requests a controlled device to install an application and comprises a parameter representing whether a control point that controls the controlled device via a network is interested in information about the application, from the control point; transmitting a fourth message including the information about the application according to the parameter, to the control point; receiving a first message that requests the application to start, from the control point and operating the application; and transmitting a second message that represents a state change of the application, to the control point.

According to another aspect of the present invention, there is provided a computer readable recording medium having recorded thereon a program for executing a second message transmitting method comprising: receiving from the control point, a third message that requests a controlled device to install an application and comprises a parameter representing whether a control point that controls the controlled device via a network is interested in information about the application; transmitting a fourth message comprising the information about the application according to the parameter, to the control point; receiving a first message that requests the application to start, from the control point, and operating the application; and transmitting the second message that represents a state change of the application, to the control point.

According to another aspect of the present invention, there is provided a control point for controlling a controlled device, the control point comprising: an application transmitting unit which transmits an application to the controlled device if the application is desired to be installed in the controlled device; an application start requesting unit which transmits a first message that comprises a parameter specifying at least one of services included in the application and request the application to start, to the controlled device; and a second message processing unit which receives from the controlled device a second message that represents a state change of the at least one service specified by the parameter and processes the second message.

According to another aspect of the present invention, there is provided a controlled device comprising: an application installing unit which installs an application received from a control point, in the controlled device; an application operating unit which receives a first message comprising a parameter specifying at least one of services included in the application and requests the application to start, from the control point and operates the application; and a second message generating unit to generate a second message that represents a state change of the at least one service specified by the parameter.

According to another aspect of the present invention, there is provided a control point for controlling a controlled device, the control point comprising: an application transmitting unit which transmits to a controlled device, a third message that requests the controlled device to install an application and comprises a parameter representing whether the control point is interested in information about the application; an application start requesting unit which receives a fourth message comprising the information about the application according to the parameter, and transmits a first message that requests the application to start, to the controlled device; and an event message processing unit which receives from the controlled device a second message that represents a state change of the application and process the event message.

According to another aspect of the present invention, there is provided a controlled device comprising: an application installing unit which receives a third message that requests the controlled device to install an application and comprises a parameter representing whether the control point is interested in information about the application, from the control point; a service information providing unit which transmits a fourth message comprising the information about the application according to the parameter to the control point; an application operating unit which receives a first message that requests the application to start, from the control point and operates the application; and a second message generating unit which generates a second message that represents a state change of in the application.

According to another aspect of the present invention, there is provided an event message transmitting method comprising: receiving an installation message that requests a controlled device to install an application and comprises a parameter designating a plurality of devices desiring to receive a state change of the application, from a control point that controls the controlled device via a network; and transmitting an event message that represents the state change of the application that occurs during an installation of the application, to the plurality of devices designated by the parameter.

According to another aspect of the present invention, there is provided a computer readable recording medium having recorded thereon a program for executing an event message transmitting method comprising: receiving an installation message that requests a controlled device to install an application and comprises a parameter designating a plurality of devices desiring to receive a state change of the application, from a control point that controls the controlled device via a network; and transmitting an event message that represents the state change of the application that occurs during an installation of the application, to the plurality of devices designated by the parameter.

According to another aspect of the present invention, there is provided an event message transmitting method comprising: receiving a third message that requests a controlled device to install an application and comprises a parameter designating a plurality of devices desiring to receive a state change of the application, from a control point that controls the controlled device via a network; and transmitting a second message that represents the state change of the application that occurs during an installation of the application, to the plurality of devices designated by the parameter.

According to another aspect of the present invention, there is provided a computer readable recording medium having recorded thereon a program for executing a second message transmitting method comprising: receiving a third message that requests a controlled device to install an application and comprises a parameter designating a plurality of devices desiring to receive a state change of the application, from a control point that controls the controlled device via a network; and transmitting the second message that represents the state change of the application that occurs during an installation of the application, to the plurality of devices designated by the parameter.

BRIEF DESCRIPTION OF THE DRAWINGS

The above and other features and aspects of the present invention will become more apparent by describing in detail exemplary embodiments thereof with reference to the attached drawings in which:

FIG. 10 is a conceptual diagram illustrating the UPnP based eventing operation explained in FIG. 9;

FIGS. 11A through 11C illustrate parts of an installation message illustrated in FIG. 10;

DETAILED DESCRIPTION OF THE INVENTION

Figure 1:
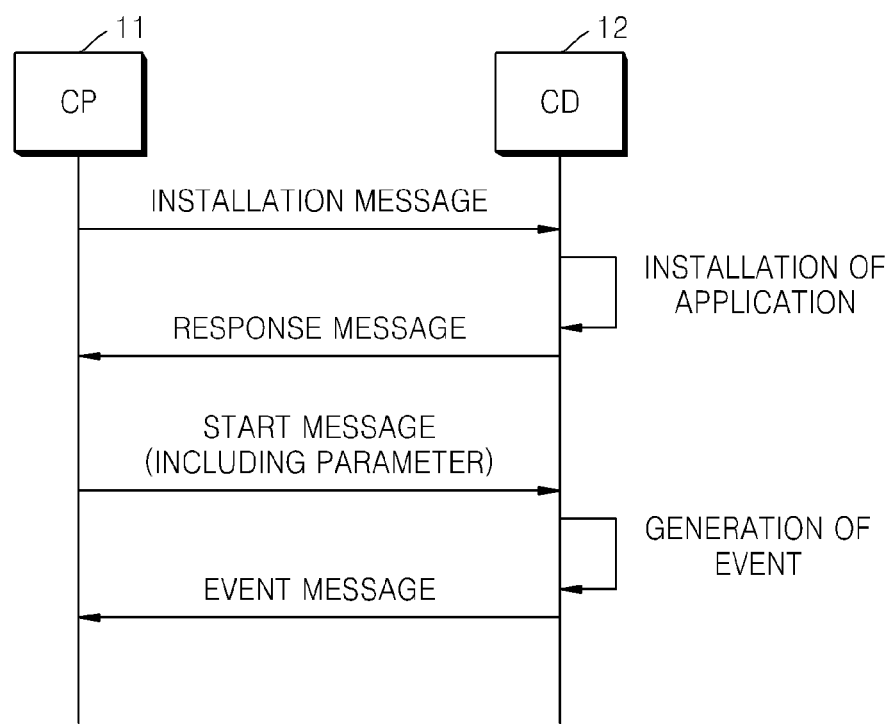
FIG. 1 is a conceptual diagram illustrating a Universal Plug and Play (UPnP) based eventing operation according to an embodiment of the present invention.

The present invention will now be described more fully with reference to the accompanying drawings, in which exemplary embodiments of the invention are shown. Like reference numerals in the drawings denote like elements, and thus their description will be omitted.

Universal Plug and Play (UPnP) will now be described before a description of embodiments of the present invention with reference to the accompanying drawings. A UPnP network is comprised of a controlled device (CD), which is connected to an Internet Protocol (IP) based home network and controlled via the IP based home network, and a control point (CP) for controlling the CD via the IP based home network. The UPnP network uses a UPnP protocol stack architecture, which includes protocols of the IP suite such as Transmission Control Protocol/Internet Protocol (TCP/IP) and Hypertext Transfer Protocol (HTTP) and technologies such as an Extensible Markup Language (XML) and a Simple Object Access Protocol (SOAP) and thus allows the CP and the CD to communicate with each other by progressing through the following stages.

A first stage is an addressing operation, in which the CP and the CD are given respective IP addresses. When participating in a network, the CD receives its own IP address by using a Dynamic Host Configuration Protocol (DHCP), or is given an IP address by using an automatic IP function when the network has no DHCP servers.

A second stage is a discovery operation, in which the CP searches for the CD or the CD announces its own location. The discovery stage is performed using a Simple Service Discovery Protocol (SSDP). If the CD is added to the network, the CD transmits an alive message of an SSDP to the network by using an IP multicast function, and the CP receives the alive message and is thus aware as to whether the CD exists. If the CP newly participates in the network, the CP multicasts a multicast-search (M-search) message of the SSDP to the network and CDs check the M-search message and thus send M-search response messages including information about the CDs themselves to the CP.

A third stage is a description operation, in which the CP checks the content of descriptions of the CDs. The CP checks the response message and, if necessary, may request the CDs for detailed information about the CDs themselves. In response to the request, the CDs transmit information about themselves in the form of an XML document.

A fourth stage is a control operation, in which the CP controls the CDs to operate. If the CP desires to control a CD, the CP sends a desired service based on detailed information about the CD to the CD by using a Simple Object Access Protocol (SOAP). The SOAP is an XML-based protocol which uses the HTTP in order to achieve a Remote Function Call (RFC).

A fifth stage is an eventing operation, in which the CP receives event changes of the CDs. When it is desired to receive event messages from the CDs, the CP sends event subscription calls to the CDs. If the subscriptions are successful, the CDs transmit the event messages to the CP by using a General Event Notification Architecture (GENA).

A sixth state is a presentation operation, in which the CP represents states of the CDs by using the HTML of the CDs.

FIG. 1 is a conceptual diagram illustrating a Universal Plug and Play (UPnP) based eventing operation according to an embodiment of the present invention.

Referring to FIG. 1, a control point (CP) 11 and a controlled device (CD) 12 communicate with each other according to a UPnP based protocol. The CD 12 operates in an OSGi based framework. However, the current embodiment of the present invention is not limited to this protocol and this framework. In other words, the CP 11 and the CD 12 may communicate with each other according to a protocol based on Java Intelligent Network Infra-structure (Jini), Home Audio Video Interoperability (HAVi), or others, and the CD 12 may operate in various other frameworks.

The OSGi framework, which is a kind of middleware framework implemented in a JAVA environment, is standard technology with respect to a service environment. A unit in which the OSGi framework is performed is a bundle, and the OSGi framework manages these bundles. The OSGi framework provides an execution environment where the bundles can be installed, updated, and uninstalled.

The CP 11 transmits an installation message requesting installation of an application to the CD 12 via a network. The installation message may include the corresponding application, the address of the CD 12, the address of a device (that is, the CP 11 or another control point) that desires to receive state information about the application installed in the CD 12, and other information. Here, the device that desires to receive the state information about the application installed in the CD 12 may be the CP 11 and a plurality of external devices.

The CD 12 installs the application in the OSGi framework according to the installation message received from the CP 11. Thereafter, the CD 12 transmits a response message including information about an installation state of the application to the CP 11.

Then, the CP 11 transmits a start message, requesting the application installed in the CD 12 to start, to the CD 12. The start message may include a parameter that specifies at least one of services included in the application. Alternatively, the parameter may not be included in the start message and may be transmitted simultaneously when the start message is transmitted. More specifically, the CP 11 transmits to the CD 12 a start message including a parameter that specifies some services which the CP 11 is interested in, from among the services included in the application. The parameter may include the names of the services of interest and state variables for the services of interest.

The CD 12 starts an operation of the application in response to the start message received from the CP 11. When a state change occurs in a service of the application which is under operation, the CD 12 generates an event message representing the state change of the service. Then, the CD 12 transmits the event message to the CP 11. Accordingly, the CP 11 can recognize the state change of the service included in the application installed in the CD 12.

Figure 2:
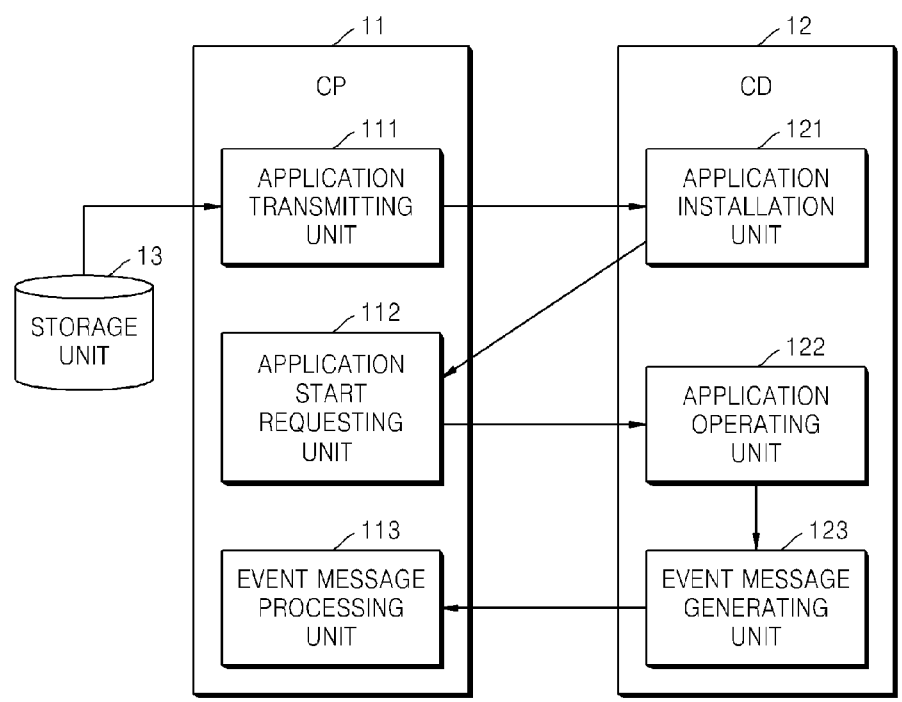
FIG. 2 is a block diagram of a control point (CP) and a controlled device (CD) illustrated in FIG. 1.

FIG. 2 is a block diagram of the CP 11 and the CD 12 illustrated in FIG. 1. Referring to FIG. 2, the CP 11 controls the CD 12 via the network and includes an application transmitting unit 111, an application start requesting unit 112, and an event message processing unit 113.

When the CP 11 desires to install an application in the CD 12, the application transmitting unit 111 transmits an installation message including the application to the CD 12. The application transmitting unit 111 may previously store the application. In another embodiment, the application transmitting unit 111 does not previously store the application but may receive the application from a storage unit 13 included in a separate device such as a contents server and may transmit the installation message including the received application to the CD 12. For example, the installation message may correspond to an InstallApplication ( ) action.

When receiving a response message for the installation message from the CD 12, the application start requesting unit 112 transmits a start message requesting a start of the application to the CD 12. The start message may include a parameter that specifies some services in which the CP 11 is interested in terms of state changes from among services included in the application. The parameter may include the names of the services of interest and the state variables for the services of interest.

More specifically, the start message may correspond to a StartApplication ( ) action. Variables of the StartApplication ( ) action may be an identifier of the application and a string of a parameter for the services of interest. It will be understood by those of ordinary skill in the art that the string of the parameter may vary according to the type of service of interest and the type of state variable of the service.

For example, the parameter may include service names (SNs) and service state variables (SVs), and may be expressed as (SN1{SV1, SV2, SV3, . . . } & SN2{SV1, SV2, . . . } . . . ). In this case, the CP 11 specifies first, second, and third state variables SV1, SV2, and SV3 of a first service SN1 and first and second state variables SV1 and SV2 of a second service SN2 among the services included in the application installed in the CD 12. Accordingly, in this case, an effect where the CP 11 sends a subscription message to the CD 12 in order to listen to state changes with respect to the first, second, and third state variables SV1, SV2, and SV3 of the first service SN1 and the first and second state variables SV1 and SV2 of the second service SN2 among the services included in the application installed in the CD 12 is generated.

If the parameter string contains |*|,| the CP 11 specifies all of the services included in the application installed in the CD 12 and all of the state variables of the services. Accordingly, in this case, an effect where the CP 11 sends a subscription message to the CD 12 in order to listen to state changes with respect to all of the services included in the application installed in the CD 12 and all of the state variables of the services is generated.

As described above, without needing to send a subscription message for each service to the CD 12, the CP 11 may only need to transmit a start message including a parameter specifying at least one service in order to receive an event message for the specified at least one service and recognize a state change of the specified at least one service.

The event message processing unit 113 requests a suitable action or performs a suitable operation according to the event message received from the CD 12.

The CD 12 operates in a predetermined execution environment, and is controlled by the CP 11 via the network. The CD 12 includes an application installation unit 121, an application operating unit 122, and an event message generating unit 123.

The application installation unit 121 installs the application received from the application transmitting unit 111 included in the CP 11 and transmits information about an installation status of the application to the CP 11. For example, the network may be a UPnP network and thus the application installation unit 121 may transmit the installation status of the application in the format of a UPnP event message.

More specifically, another application may be needed in order to properly install the desired application. The desired application may be in a first or second state according to the existence or absence of the needed application. However, the state of the application is not limited to the first or second state, but the application may be in one of a plurality of states.

In other words, when another application that is needed to install the desired application does not exist, the state of the desired application may be in a first state. On the other hand, when another application needed to install the desired application exists, the state of the desired application may be in a second state. When the desired application is in the first state, the installation of the desired application cannot be completed. Thus, the CP 11 cannot request the CD 12 to perform a predetermined action. On the other hand, when the desired application is in the second state, the installation of the desired application can be completed. Thus, the CP 11 can request the CD 12 to perform a predetermined action, thereby enabling normal communications between the CP 11 and the CD 12.

For example, the CD 12 may operate in an OSGi framework, and the desired application may correspond to a first bundle. In this case, a second bundle may be needed to properly install the first bundle, and the first bundle may be in a first or second state according to whether the second bundle exists. When a bundle is installed onto the framework the bundle moves to an installed☐state. The framework will then try to resolve the bundle. When the second bundle that is needed to install the first bundle does not exist, the first bundle remains in the installed state corresponding to the first state. On the other hand, when the second bundle that is needed to install the first bundle exists, the first bundle moves to a resolved state corresponding to the second state. More specifically, when the second bundle does not exist upon installation of the application in the application installation unit 121, the first bundle remains in the installed state. At this time, the installation of the first bundle has not been completed, the CP 11 cannot start the first bundle. On the other hand, when the second bundle exists upon installation of the application in the application installation unit 121, the first bundle moves to the resolved state, and the CP 11 can start the first bundle.

The application operating unit 122 performs services included in the application in response to the start message received from the application operating unit 112, and approves an event subscription for the service specified in the parameter included in the start message. As described above, the start message may include a parameter that specifies a service in which the CP 11 is interested in terms of a state change from among the services included in the application. Accordingly, although an explicit event subscription call has not been made by the CP 11, the application operating unit 122 approves an event subscription for the service specified in the parameter included in the start message.

When a state change occurs in the service specified in the parameter from among the services included in the application during the operation of the application operating unit 122, the event message generating unit 123 generates an event message for the service. For example, the network may be a UPnP network and thus the event message generating unit 123 may generate the event message in a UPnP format.

Since FIG. 2 is a block diagram for describing an eventing operation between the CP 11 and the CD 12, only blocks used in the eventing operation are illustrated in FIG. 2. In other words, other blocks may be further included in the CP 11 and the CD 12 according to the stage in which the CP 11 and the CD 12 communicate with each other.

Figure 3:
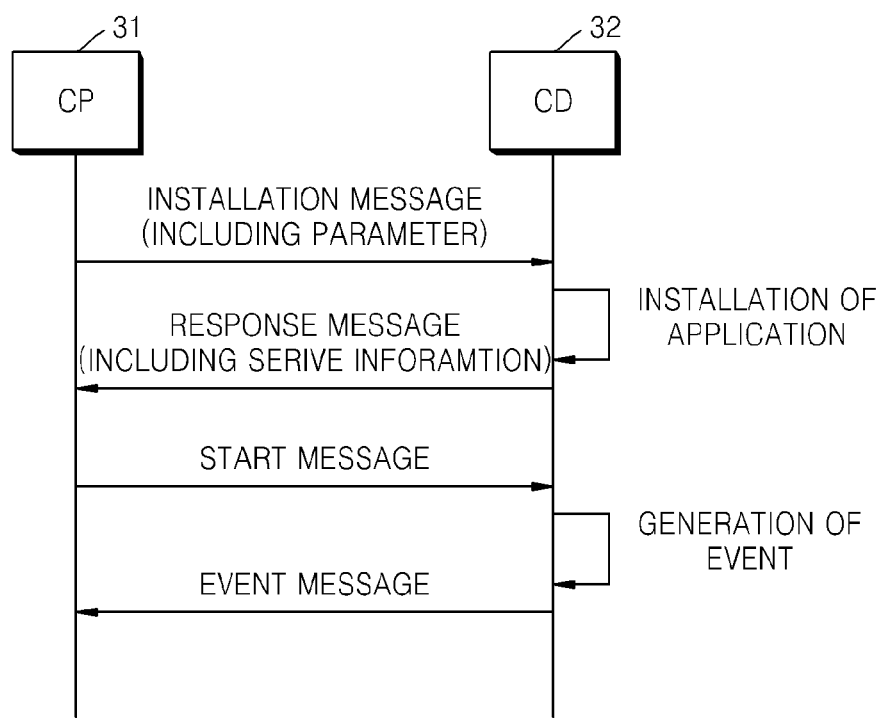
FIG. 3 is a conceptual diagram illustrating a UPnP based eventing operation according to another embodiment of the present invention.

FIG. 3 is a conceptual diagram illustrating a UPnP based eventing operation according to another embodiment of the present invention. Referring to FIG. 3, a CP 31 and a CD 32 communicate with each other according to a UPnP based protocol. The CD 32 operates in an OSGi based framework. However, the current embodiment of the present invention is not limited to this protocol and this framework. In other words, the CP 31 and the CD 32 may communicate with each other according to a protocol based on Jini, HAVi, or others, and the CD 32 may operate in various other frameworks.

The CP 31 transmits, to the CD 32 via the network, an installation message that requests installation of an application to the CD 32 via a network and includes a parameter representing whether the CP 31 is interested in detailed information about the application installed in the CD 32. More specifically, the CP 31 transmits to the CD 32 an installation message that includes a parameter representing whether the CP 31 desires to receive detailed information about the services included in the application installed in the CD 32. The detailed information about the application may be completion or incompletion of the installation of the application, a state change of the application which occurs during an operation of the application, or the like. Alternatively, the parameter may not be included in the installation message and may be transmitted simultaneously when the installation message is transmitted. The parameter may be transmitted at a time different from the time when the installation message is transmitted.

The installation message may further include at least one of parameters that represent the address of the CD 32 in which the application is to be installed, the address of a device (that is, the CP 31 or another control point) that desires to receive an event message representing a state change of the application installed in the CD 32, and the type of application. More specifically, when a special device such as a content server desires to receive the event message representing the state change of the application, a Uniform Resource Locator (URL) of the special device may be included in the installation message. The network may be a wired or wireless network, and may be home network middleware such as UPnP, Jini, or HAVi. A home network may use a single network protocol or a plurality of network protocols.

The CD 32 installs the application according to the installation message received from the CP 31. Thereafter, the CD 32 transmits a response message including information about an installation state of the application to the CP 31. When the parameter included in the installation message represents content that the CP 31 desires to receive detailed information about the services included in the application, the CD 32 includes the detailed information about each of the services in a response message and transmits the response message to the CP 31. The CD 32 may operate in a predetermined execution environment, for example, an OSGi framework.

Then, the CP 31 transmits a start message requesting the application installed in the CD 32 to start, to the CD 32. Then, the CD 32 starts an operation of the application in response to the start message received from the CP 31. When a state change occurs in a service of the application which is under operation, the CD 32 generates an event message representing the state change of the service.

Then, the CD 32 transmits the event message to the CP 31. Accordingly, the CP 31 can recognize the state change of the service included in the application installed in the CD 32. When the URL of the special device desiring to receive the event message is included in the parameter included in the installation message, the CD 32 transmits the event message to the CP 31 and the special device according to the UPnP-based protocol. Accordingly, the special device as well as the CP 31 can recognize the state change of the service included in the application installed in the CD 32.

Figure 4:
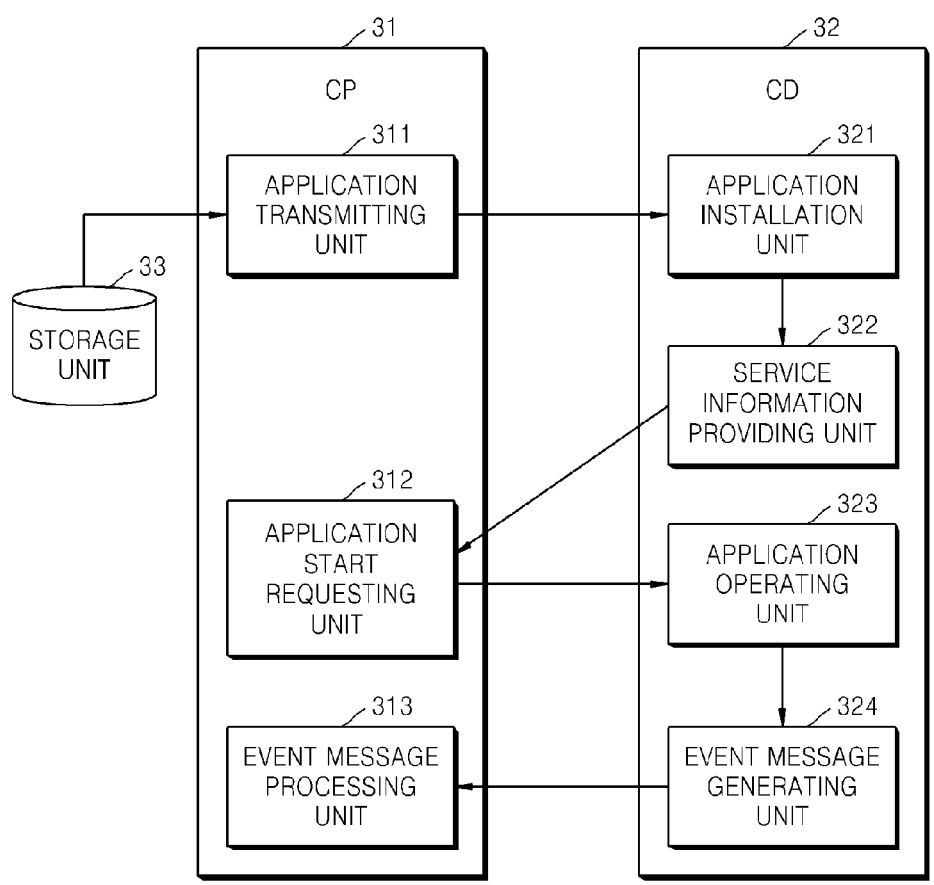
FIG. 4 is a block diagram of a CP and a CD illustrated in FIG. 3.

FIG. 4 is a block diagram of the CP 31 and the CD 32 illustrated in FIG. 3. Referring to FIG. 4, the CP 31 controls the CD 32 via the network and includes an application transmitting unit 311, an application start requesting unit 312, and an event message processing unit 313.

When the CP 31 desires to install an application in the CD 32, the application transmitting unit 311 transmits to the CD 32 an installation message that requests the application to be installed and includes a parameter representing whether the CP 31 is interested in the detailed information about the application. The application transmitting unit 311 does not previously store the application but may receive the application from a storage unit 33 included in a separate device such as a contents server when the CP 31 desires to install the application in the CD 12. Then, the application transmitting unit 311 may transmit the installation message including the received application to the CD 32.

When the application transmitting unit 311 previously stores the application, the CP 31 is aware of the detailed information about the application and thus does not need to receive separate information from the CD 32. On the other hand, when the application transmitting unit 311 does not previously store the application but receives the application from the storage unit 33 and transmits the application to the CD 32, the CP 31 is not aware of the detailed information about the application. Accordingly, in this case, the CP 31 needs to receive the detailed information about the application. As described above, when the CP 31 does not previously store the application and transmits the application received from a separate device to the CD 32, a parameter representing whether the CP 31 is interested in the detailed information about the application needs to be included in the installation message.

More specifically, the parameter representing whether the CP 31 is interested in the detailed information about the application may be expressed as a service flag. When the application transmitting unit 311 does not previously store the application, the CP 31 needs to receive the detailed information about the application. In this case, the service flag is true. On the other hand, when the application transmitting unit 311 previously stores the application, the CP 31 does not need to receive the detailed information about the application. In this case, the service flag is false.

The installation message may correspond to an InstallApplication ( ) action. In this case, variables of the InstallApplication ( ) action may be at least one of a Uniform Resource Locator (URL) of a device in which an application is to be installed, an event subscription URL of a device which desires to receive information about a state change of the application, a service flag representing whether a control point is interested in detailed information about the application, and the type of application (e.g., a bundle or a deployment package).

When receiving a response message including the detailed information from the CD 32, the application start requesting unit 312 transmits a start message requesting a start of the application to the CD 32. The start message may include a parameter that specifies some services in which the CP 31 is interested in terms of state changes from among services included in the application. The parameter may include the names of the services of interest and the state variables for the services of interest. For example, the start message may correspond to a StartApplication ( ) action.

The event message processing unit 313 requests a suitable action or performs a suitable operation according to the event message received from the CD 32.

The CD 32 operates in a predetermined execution environment, and is controlled by the CP 31 via the network. The CD 32 includes an application installation unit 321, a service information providing unit 322, an application operating unit 323, and an event message generating unit 324.

The application installation unit 321 installs the application according to the installation message received from the application transmitting unit 311 included in the CP 31. In this case, another application may be needed in order to properly install the desired application. The desired application may be in a first or second state according to the existence or absence of the needed application. However, the state of the application is not limited to the first or second state, but the application may be in one of a plurality of states.

The service information providing unit 322 searches for the application installed according to the parameter included in the installation message received from the application transmitting unit 311 and provides detailed information about the application to the CP 31. As described above, the parameter may correspond to a service flag representing whether the CP 31 is interested in the detailed information about the application installed in the CD 32. When the service flag is true, the service information providing unit 322 provides the detailed information about the application to the CP 31. On the other hand, when the service flag is false, the service information providing unit 322 does not provide the detailed information about the application to the CP 31.

The CD 32 transmits to the CP 31 a response message that includes the installation state of the application provided by the application installation unit 321 and the detailed information about the application provided by the service information providing unit 322.

The application operating unit 323 performs services included in the application in response to the start message received from the application operating unit 312. As described above, the start message may include a parameter that specifies a service in which the CP 31 is interested in terms of a state change from among the services included in the application.

When a state change occurs in some of the services included in the application during the operation of the application operating unit 323, the event message generating unit 324 generates an event message for the services. The event message may be transmitted to the CP 31 and/or the special device according to the parameter included in the installation message. For example, the network may be a UPnP network and thus the event message generating unit 324 may generate the event message in a UPnP format.

Since FIG. 4 is a block diagram for describing an eventing operation between the CP 31 and the CD 32, only blocks used in the eventing operation are illustrated in FIG. 2. In other words, other blocks may be further included in the CP 31 and the CD 32 according to the stage in which the CP 31 and the CD 32 communicate with each other.

Figure 5:
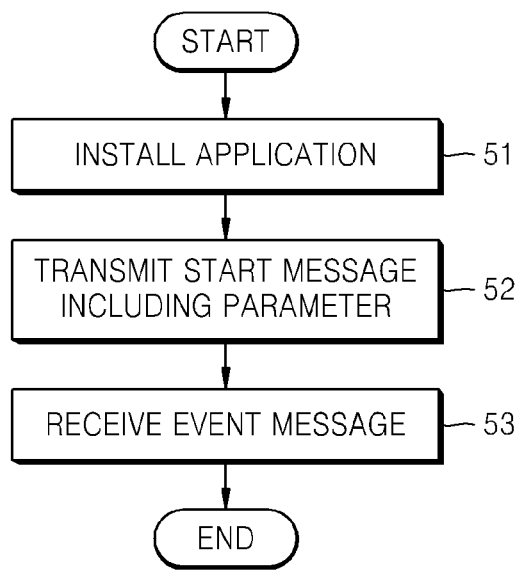
FIG. 5 is a flowchart illustrating a selective event message receiving method according to an embodiment of the present invention.

FIG. 5 is a flowchart illustrating a selective event message receiving method according to an embodiment of the present invention. Referring to FIG. 5, the selective event message receiving method includes operations which are sequentially performed by the CP 11 of FIG. 2. The above description of the CP 11 is equally applied to the selective event message receiving method of FIG. 5.

In operation 51, the application transmitting unit 111 transmits an installation message for installing an application, to the CD 12 via the network. More specifically, the application transmitting unit 111 transmits the installation message to the CD 12 via the network and receives a response message associated with the installation state of the application from the CD 32.

In operation 52, the application start requesting unit 112 transmits to the CD 12 a start message which requests a start of the application and includes a parameter specifying at least one of the services included in the application. The parameter specifies the name of at least one service in which the CP 11 is interested in terms of a state change from among the services included in the application, and state variables of the at least one service.

In operation 53, the event message processing unit 113 receives an event message representing the state change of the at least one service from the CD 12. In this case, the event message processing unit 113 requests a suitable action or performs a suitable operation according to the event message.

Figure 6:
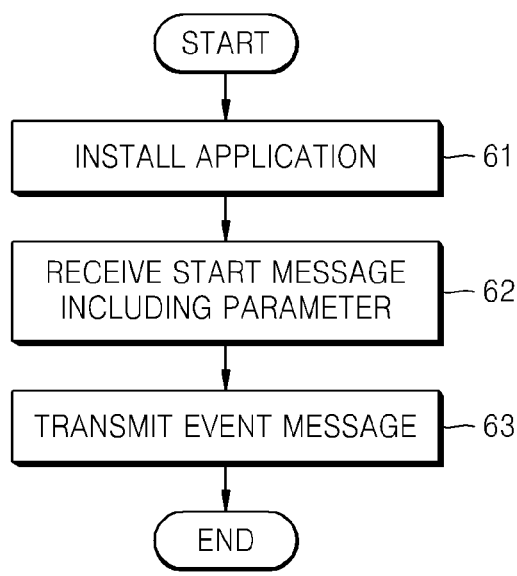
FIG. 6 is a flowchart illustrating a selective event message transmitting method according to an embodiment of the present invention.

FIG. 6 is a flowchart illustrating a selective event message transmitting method according to an embodiment of the present invention. Referring to FIG. 6, the selective event message transmitting method includes operations which are sequentially performed by the CD 12 of FIG. 2. The above description of the CD 12 is equally applied to the selective event message transmitting method of FIG. 6.

In operation 61, the application installation unit 121 installs the application received from the CP 11. More specifically, the application installation unit 121 receives the installation message for installing the application from the CP 11 and transmits the response message associated with the installation state of the application to the CP 11.

In operation 62, the application operating unit 122 receives from the CP 11 the start message which requests a start of the application and includes a parameter specifying at least one of the services included in the application. The parameter specifies the name of at least one service in which the CP 11 is interested in terms of a state change from among the services included in the application, and state variables of the at least one service.

In operation 63, when a state change occurs in the services included in the application during an operation of the application, the event message generating unit 123 transmits an event message representing the state changes of the services to the CP 11. More specifically, the event message generating unit 123 approves a subscription for the at least one service included in the parameter. When a state change occurs in the at least one service, the event message generating unit 123 transmits the name of the corresponding service and the state variables thereof within the event message.

Figure 7:
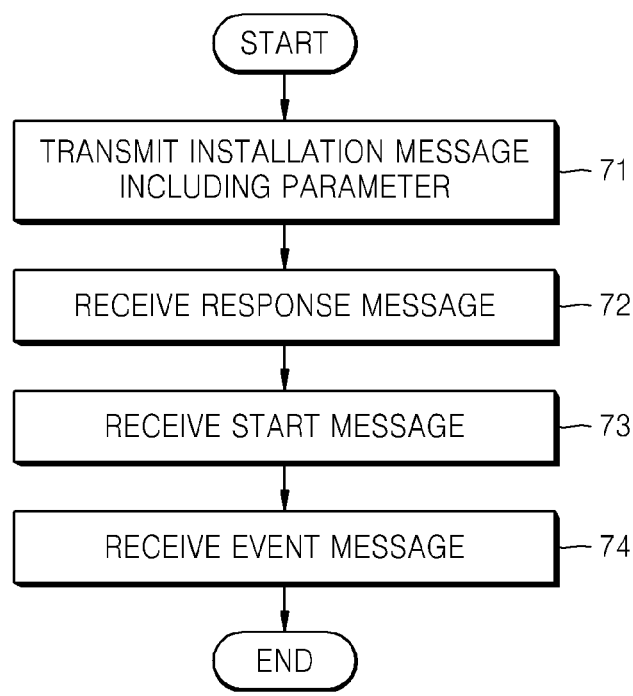
FIG. 7 is a flowchart illustrating a selective event message receiving method according to another embodiment of the present invention.

FIG. 7 is a flowchart illustrating a selective event message receiving method according to another embodiment of the present invention. Referring to FIG. 7, the selective event message receiving method includes operations which are sequentially performed by the CP 31 of FIG. 4. The above description of the CP 31 is equally applied to the selective event message receiving method of FIG. 7.

In operation 71, the application transmitting unit 311 transmits to the CD 32 an installation message that requests the CD 32 to install the application and includes a parameter representing whether the CP 31 is interested in detailed information about the application. In this case, the application transmitting unit 311 may receive the application from a contents server and request the CD 32 to install the received application. In this case, the installation message may include at least one of parameters that represent an address of the CD 32, an address of a device which desires to receive an event message, and the type of application.

In operation 72, the application start requesting unit 312 receives from the CD 32 a response message that includes the detailed information about the application according to the parameter.

In operation 73, the application start requesting unit 312 transmits a start message requesting a start of the application to the CD 32.

In operation 74, the event message processing unit 313 receives an event message representing the state change of the application to the CD 32.

Figure 8:
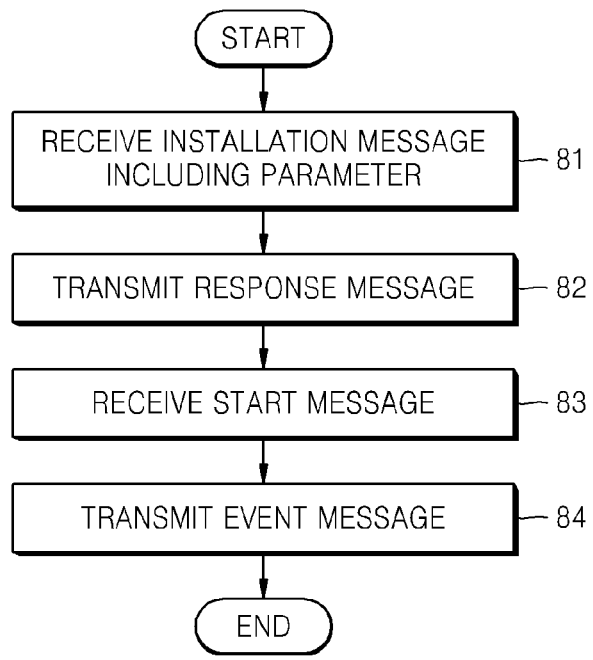
FIG. 8 is a flowchart illustrating a selective event message transmitting method according to another embodiment of the present invention.

FIG. 8 is a flowchart illustrating a selective event message transmitting method according to another embodiment of the present invention. Referring to FIG. 8, the selective event message transmitting method includes operations which are sequentially performed by the CD 32 of FIG. 4. The above description of the CD 32 is equally applied to the selective event message transmitting method of FIG. 8.

In operation 81, the application installation unit 321 receives, from the CP 31 via the network, an installation message that requests the CD 32 to install the application and includes a parameter representing whether the CP 31 is interested in detailed information about the application.

In operation 82, the service information providing unit 322 transmits to the CP 31 a response message that includes the detailed information about the application according to the parameter.

In operation 83, the application operating unit 323 receives from the CP 31 a start message that requests a start of the application, and operates the application.

In operation 84, the event message generating unit 324 transmits an event message representing a state change of the application to the CP 31.

Figure 9:
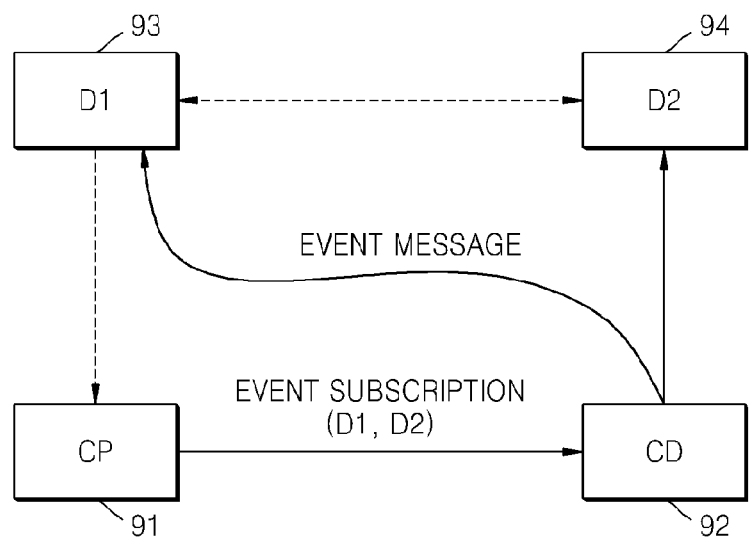
FIG. 9 is a block diagram for explaining a UPnP-based eventing operation according to another embodiment of the present invention.

FIG. 9 is a block diagram for explaining a UPnP-based eventing operation according to another embodiment of the present invention.

Referring to FIG. 9, a CP 91 and a CD 92 are home network devices, and a first device (D1) 93 and a second device (D2) 94 are external devices. Although only the D1 93 and the D2 94 are illustrated in FIG. 9, it may be understood by one of ordinary skill in the art to which the current embodiment of the present invention pertains that the number of external devices is not limited to two. In FIG. 9, solid lined arrows indicate communications based on the UPnP, and dotted lined arrows indicate communications not based on the UPnP.

More specifically, the D2 94, which is a manufacturer for manufacturing a predetermined application (for example, firmware), may provide the predetermined application to the D1 93 according to a contract with the D1 93. The D1 93 may be a service provider that provides the predetermined application received from the D2 94 to the CP 91. For example, the D2 94 may be a mobile phone manufacturer, and the D1 93 may be a service provider that provides a service so that a user can use a mobile phone manufactured by the D2 94.

In an embodiment of the present invention, when the CP 91 transmits to the CD 92 an installation message for installing an application into the CD 92, the CP 91 may transmit the installation message by including a parameter that includes addresses of the D1 93 and the D2 94. Accordingly, an event message generated in a stage where the CD 92 installs an application may be transmitted to the D1 93 and the D2 94 corresponding to the addresses included in the parameter, according to the UPnP based protocol. For example, when the installation of the application in the CD 92 is completed, an event message representing the completion of the installation of the application in the CD 92 may be transmitted to the D1 93 and the D2 94 not to the CP 91.

In another embodiment of the present invention, when the CP 91 transmits the installation message to the CD 92, the CP 91 may transmit the installation message by including a parameter that includes only the address of the D1 93. For example, if a specific contract between the D1 93 and the D2 94 does not exist, only the address of the D1 93 may be included in the parameter. Accordingly, the event message generated in the stage where the CD 92 installs the application may be transmitted to the D1 93 according to the UPnP-based protocol. In this case, when the D2 94 also wants to receive the event message generated by the CD 92, the D1 93 may transmit the received event message to the D2 94 according to the protocol not based on the UPnP. Thus, the D2 94 may receive the event message generated by the CD 92 after a predetermined delay time.

FIG. 10 is a conceptual diagram illustrating the UPnP based eventing operation explained in FIG. 9. The UPnP based eventing operation will now be described according to time with reference to FIGS. 9 and 10.

Referring to FIG. 10, the CP 91 transmits, to the CD 92 via a network, an installation message that requests installation of an application to the CD 92 and includes a parameter representing an address of a device that desires to receive detailed information about the application. As described above, due to the inclusion of the parameter in the installation message, an effect where an event subscription to the CD 92 is automatically performed without a special event subscription procedure is generated.

As described above, the parameter may be separated from the installation message and the parameter and the installation message may be simultaneously transmitted. Alternatively, the parameter and the installation message may be transmitted at different points of time. However, these are just examples, and the parameter representing the address of the device that desires to receive detailed information about the application may be included in a start message instead of being included in the installation message. In this case, the parameter may be separated from the start message and the parameter and the start message may be simultaneously transmitted. Alternatively, the parameter and the start message may be transmitted at different points in time.

In an embodiment of the present invention, the CP 91 may indicate the addresses of the D1 93 and the D2 94 in the parameter. In this case, an event message depending on a state change of the application installed in the CD 92 is transmitted to the D1 93 and the D2 94 not to the CP 91.

The CD 92 may install the application according to the installation message received from the CP 91. Then, the CD 92 transmits to the CP 91 a response message that includes information about an installation state of the application. Although not shown in FIG. 10, the CD 92 may transmit information about an installation state of the application in parallel to the D1 93 and the D2 94 corresponding to the addresses designated by the parameter, in the form of an event message conforming to the UPnP-based protocol. For example, when the installation of the application in the CD 92 is completed, the CD 92 may transmit, to the D1 93 and the D2 94 in parallel, an event message that represents the completion of the installation of the application and conforms to the UPnP-based protocol.

Thereafter, the CP 91 transmits to the CD 92 a start message requesting an operation of the application installed in the CD 92 to start. Then, the CD 92 starts the operation of the application in response to the start message received from the CP 91. When a state change occurs in a service of the application which is under operation, the CD 92 generates an event message representing the state change of the service.

Then, the CD 92 may transmit the generated event message to the D1 93 and the D2 94 in parallel. In this case, although being external devices other than the home network devices, the D1 93 and the D2 94 may receive event messages conforming to the UPnP-based protocol. The CD 92 may transmit the generated event message to the D1 93 and the D2 94 either at the same time or at different points in time. Accordingly, when the event message is generated by the CD 92, the D1 93 and the D2 94 may immediately receive the event message. As described above, a UPnP device architecture needs to be modified in order to transmit an event message to a plurality of devices. The modification of the UPnP device architecture will now be described.

FIGS. 11A through 11C illustrate parts of the installation message illustrated in FIG. 10. Cases where a plurality of devices automatically perform event subscriptions to a CD due to the use of an installation message will now be described with reference to FIGS. 10 and 11A through 11C.

Referring to FIG. 11A, CALLBACK: <delivery_URL> denotes a parameter that indicates an address of a device desiring to receive detailed information about an application. When the CD 92 generates an event message, the event message is transmitted to the device indicated by the parameter CALLBACK.

Referring to FIG. 11B, in the conventional art, when a plurality of devices desire to receive the event message, URLs of the devices are distinguished from one another by commas (,) and the event message is sequentially transmitted to the devices. For example, the devices desiring to receive the event message are designated by CALLBACK: <url1, url2, url3>, and the event message is sequentially transmitted to the url1, the url2, and the url3.

More specifically, first, the event message is transmitted to the url1. When the transmission of the event message to the url1 fails, the event message is transmitted to the url2. When the transmission of the event message to the url2 fails, the event message is transmitted to the url3. In other words, when the transmission of the event message to the url1 is completed, the transmissions of the event message to the url2 and the url3 are not performed. Accordingly, even when a plurality of devices desire to receive an event message, only one of the devices can receive the event message.

Referring to FIG. 11C, in an embodiment of the present invention, when a plurality of devices desire to receive the event message, URLs of the devices may be divided into groups by using semicolons (;) and the event message may be transmitted in parallel to the groups. In addition, the addresses of the devices included in each group may be distinguished from one another by commas (,), and the event message may be transmitted in series to the addresses of the devices included in each group.

For example, the devices desiring to receive the event message are designated by CALLBACK: <url1, url2; url3; url4, url5>, and the event message is transmitted in parallel to a first group including the url1 and the url2, a second group including the url3, and a third group including the url4 and url5. In addition, the event message is transmitted in series to the addresses included in each group. The event message may be transmitted to all of the groups simultaneously or at different points in time.

More specifically, first, the event message is transmitted in parallel to the url1, the url3, and the url4 respectively included in the first, second, and third groups. When the transmission of the event message to the url1 or the url4 fails, the event message is transmitted to the url2 or the url5. In other words, since the transmissions of the event message to the url1, the url3, and the url4 are performed in parallel, even when the transmission of the event message to the url1 is completed, the url3 and the url4 can still receive the event message. Accordingly, even when a plurality of devices desire to receive an event message, all of the devices can receive the event message.

Figure 12:
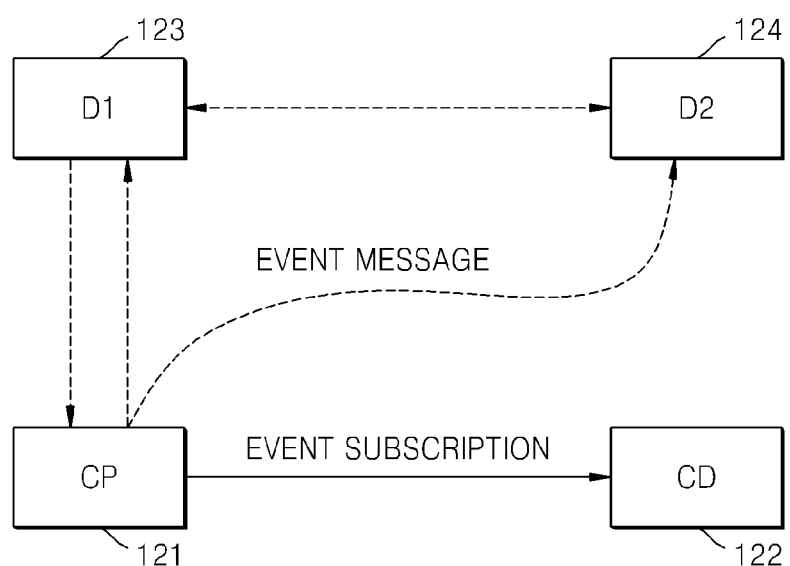
FIG. 12 is a block diagram for explaining a UPnP-based eventing operation according to another embodiment of the present invention.

FIG. 12 is a block diagram for explaining a UPnP-based eventing operation according to another embodiment of the present invention. Referring to FIG. 12, a CP 121 and a CD 122 are home network devices, and a D1 123 and a D2 124 are external devices. In FIG. 12, solid lined arrows indicate communications based on the UPnP, and dotted lined arrows indicate communications not based on the UPnP. As described above, the D2 124, which is a manufacturer for manufacturing a predetermined application, may provide the predetermined application to the D1 123 according to a contract with the D1 123. The D1 123 may be a service provider that provides the predetermined application received from the D2 124 to the CP 121.

In an embodiment of the present invention, when the CP 121 transmits to the CD 122 an installation message for installing an application into the CD 122, the CP 121 may transmit the installation message by including a parameter that includes the address of the CP 121. Accordingly, an event message generated in a stage where the CD 122 installs an application may be transmitted to the CP 121 corresponding to the address included in the parameter, according to the UPnP based protocol.

Then, the CP 121 may transmit the event message to the D1 123 and the D2 124. However, this transmission is not a communication based on the UPnP-based protocol. In this case, the D1 123 and the D2 124 fail to receive an event message immediately after the generation of the event message by the CD 122. In other words, the D1 123 and the D2 124 receive the event message after a predetermined delay time.

In another embodiment of the present invention, when the CP 121 transmits the installation message to the CD 122, the CP 121 may transmit the installation message by including a parameter that includes the addresses of the CP 121 and the D1 123. In still another embodiment of the present invention, when the CP 121 transmits the installation message to the CD 122, the CP 121 may transmit the installation message by including a parameter that includes the addresses of the CP 121 and the D2 124.

Figure 13:
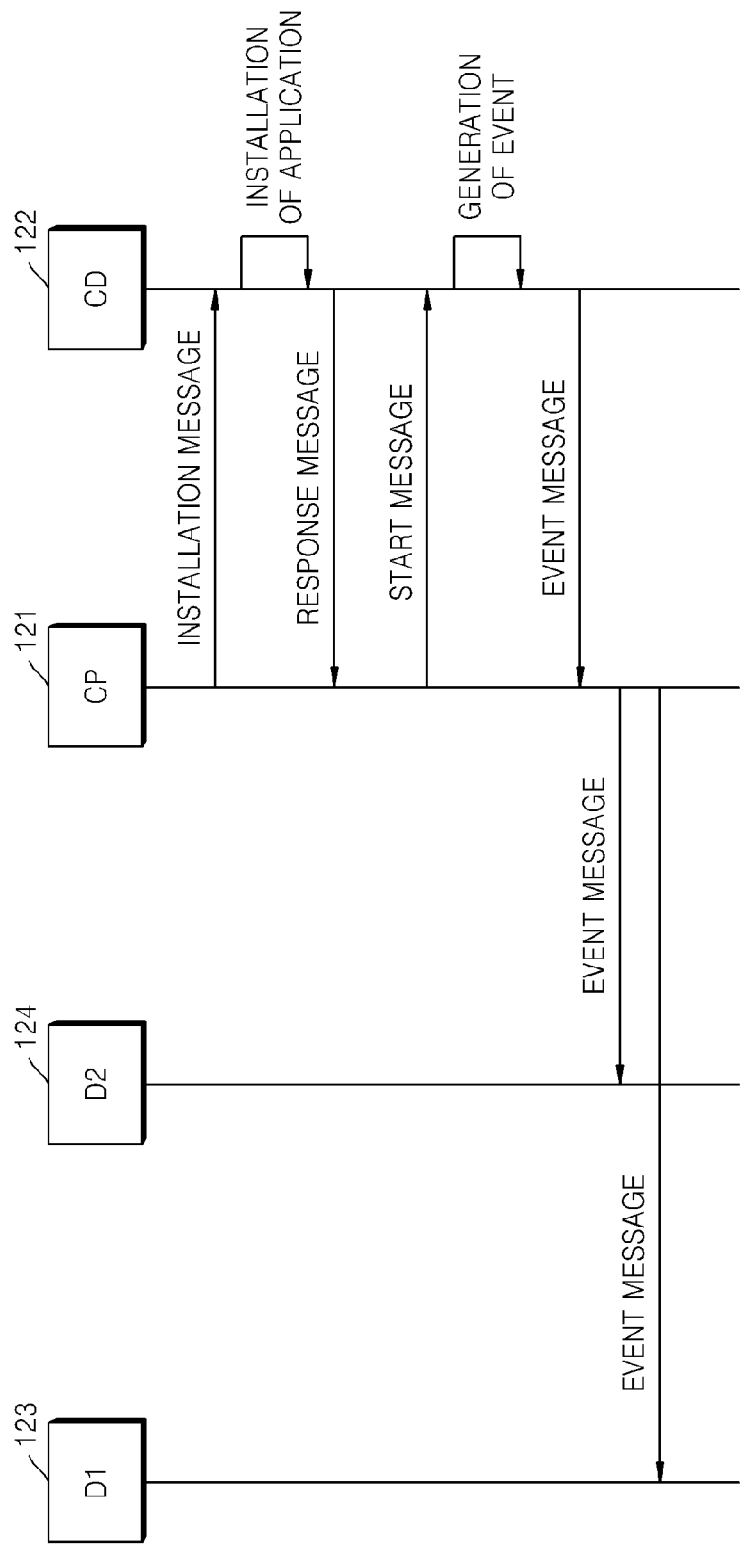
FIG. 13 is a conceptual diagram illustrating the PnP based eventing operation explained in FIG. 12.

FIG. 13 is a conceptual diagram illustrating the UPnP based eventing operation explained in FIG. 12. The UPnP based eventing operation will now be described according to time with reference to FIGS. 12 and 13.

Referring to FIG. 13, the CP 121 transmits, to the CD 122 via a network, an installation message that requests installation of an application to the CD 122 and includes a parameter representing an address of a device that desires to receive detailed information about the application. As described above, due to the inclusion of the parameter in the installation message, an effect where an event subscription to the CD 122 is automatically performed without a special event subscription procedure is generated.

As described above, the parameter may be separated from the installation message and the parameter and the installation message may be simultaneously transmitted. Alternatively, the parameter and the installation message may be transmitted at different points of time. However, these are just examples, and the parameter representing the address of the device that desires to receive detailed information about the application may be included in a start message instead of being included in the installation message. In this case, the parameter may be separated from the start message and the parameter and the start message may be simultaneously transmitted. Alternatively, the parameter and the start message may be transmitted at different points in time.

In an embodiment of the present invention, the CP 121 may indicate the address of the CP 121 in the parameter. In this case, an event message depending on a state change of the application installed in the CD 122 is transmitted to the CP 121.

The CD 122 may install the application according to the installation message received from the CP 121. Then, the CD 122 transmits to the CP 121 a response message that includes information about an installation state of the application. Thereafter, the CP 121 transmits to the CD 122 a start message requesting an operation of the application installed in the CD 122 to start. Then, the CD 122 starts the operation of the application in response to the start message received from the CP 121. When a state change occurs in a service of the application which is under operation, the CD 122 generates an event message representing the state change of the service.

Then, the CD 122 may transmit the generated event message to the CP 121 according to the UPnP-based protocol. Then, the CP 121 may transmit the received event message to the D1 123 and the D2 124 according to the protocol not based on the UPnP. The CP 121 may transmit the received event message to the D1 123 and the D2 124 either at the same time or at different points in time. Accordingly, when the event message is generated by the CD 122, the D1 123 and the D2 124 may receive the event message via the CP 121 after the lapse of a predetermined period of time. In this case, a special modification of a UPnP device architecture is not needed.

According to the present invention, an application is installed in a CD by using a network, a start message which includes a parameter specifying at least one service included in the application and requests a start of the application is transmitted to the CD, and an event message that represents a state change of the at least one service specified by the parameter is received from the CD. Accordingly, the application can be efficiently managed by selectively recognizing state changes of some services of interest from among the services included in the application.

In addition, a CP receives information about a state change of the application from the CD and thus efficiently manages a life cycle of the application that includes, for example, installation, updating, and uninstallation of the application installed in the CD.

Moreover, although the CP does not send an explicit event message call for the state change of the application, the CD can transmit an event message asynchronously every time a state change occurs in the application.

Furthermore, external devices can receive an event message that represents the state change of the application, from the CD without delay after the event message is generated.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. Other examples of computer readable recording medium may include carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An event message receiving method comprising:
transmitting to a controlled device a first message that comprises a request to execute an application and a parameter that specifies at least one service provided by the application when executed and at least one state variable for each of the at least one service provided by the executed application for which information of a state change is requested; and receiving a second message that represents the state change of the at least one state variable specified by the parameter, from the controlled device.

2. The event message receiving method of claim 1, wherein the parameter further specifies a name of the at least one service.

3. The event message receiving method of claim 1, further comprising:
transmitting a third message requesting an installation of the application, to the controlled device via the network; and
receiving a fourth message indicating an installation status of the application from the controlled device.

4. The event message receiving method of claim 1, wherein the network is a Universal Plug and Play (UPnP) based network, and the second message is written in Extensible Markup Language (XML).

5. The event message receiving method of claim 3, wherein the installation status comprises completion of the installation or incompletion of the installation.

6. The event message receiving method of claim 3, wherein the third message comprises a Uniform Resource Locator of another device receiving the second message.

7. The event message receiving method of claim 1, further comprising approving a partial subscription to the application comprising approving a subscription for the at least one service selected from among a plurality of services provided by the executed application, wherein the parameter corresponds to a service flag which represents interest in information about the application.

8. The event messaging receiving method of claim 1, wherein the state change indication comprises an indication that the controlled device successfully installed another application that enabled the controlled device to install the at least one service specified by the parameter and wherein the at least one service is at least one function provided by the application.

9. A non-transitory computer readable recording medium having recorded thereon a program for executing a second message receiving method comprising:
transmitting to a controlled device a first message that comprises a request to execute an application and a parameter that specifies at least one service provided by the application when executed and at least one state variable for each of the at least one service provided by the executed application for which information of a state change is requested; and
receiving the second message that represents the state change of the at least one state variable specified by the parameter, from the controlled device.

10. An event message transmitting method comprising:
installing an application received from a control point which controls a controlled device via a network, in the controlled device;
receiving from the control point a first message that comprises a request to execute the application and a parameter that specifies at least one service provided by the application when executed and at least one state variable for each of the at least one service provided by the executed application for which information of a state change is requested;
executing the application in response to the received first message; and
transmitting a second message that represents the state change of the at least one service specified by the parameter, to the control point.

11. The event message transmitting method of claim 10, wherein the parameter specifies a name of the at least one service.

12. The event message transmitting method of claim 11, further comprising:
approving a subscription for the at least one service from among the plurality of services provided by the executed application; and
generating the second message comprising the name of the at least one service and the at least one state variable specified by the parameter when the state change occurs in the respective state variable designated by the first message.

13. The event message transmitting method of claim 10, wherein the installing of the application comprises:
receiving a third message requesting installation of the application, from the control point; and
transmitting a fourth message indicating an installation status of the application, to the control point.

14. The event message transmitting method of claim 13, wherein the installation status comprises completion of the installation or incompletion of the installation.

15. The event message transmitting method of claim 13, wherein the third message comprises a Uniform Resource Locator of another device receiving the second message.

16. The event message transmitting method of claim 10, wherein the network is a Universal Plug and Play (UPnP) based network, and the event message is written in Extensible Markup Language (XML).

17. A non-transitory computer readable recording medium having recorded thereon a program for executing a second message transmitting method comprising:
installing an application received from a control point which controls a controlled device via a network, in the controlled device;
receiving a first message that comprises a request to execute the application and a parameter that specifies at least one service provided by the application when executed and at least one state variable for each of the at least one service provided by the executed application for which information of a state change is requested, from the control point;
executing the application based on the received first message; and
transmitting the second message that represents the state change of the at least one service specified by the parameter, to the control point.

18. An event message receiving method comprising:
transmitting to a controlled device, a third message that requests the controlled device to install an application and comprises a parameter representing whether information about the application is of interest;
receiving a fourth message comprising the information about the application according to the parameter, from the controlled device;
transmitting to the controlled device a first message that comprises a request to execute the application and a parameter that specifies at least one service provided by the application when executed and at least one state variable for each of the at least one service provided by the executed application for which information of a state change is requested; and receiving a second message that represents the state change of the at least one service specified by the parameter, from the controlled device.

19. The event message receiving method of claim 18, further comprising receiving the application from a separate device,
wherein in the transmitting of the third message, the third message requests the controlled device to install an application received from the separate device and the parameter representing whether the information about the application is of interest is transmitted to the controlled device.

20. The event message receiving method of claim 18, wherein the third message further comprises at least one of parameters that represent an address of the controlled device, an address of a device desiring to receive the second message, and a type of the application.

21. The event message receiving method of claim 18, wherein the network is a Universal Plug and Play (UPnP) based network, and the second message is written in Extensible Markup Language (XML).

22. A non-transitory computer readable recording medium having recorded thereon a program for executing a second message receiving method comprising:
transmitting to a controlled device, a third message that requests the controlled device to install an application and comprises an application parameter representing whether information about the application is of interest;
receiving a fourth message comprising the information about the application according to the application parameter, from the controlled device;
transmitting a first message that comprises a request to execute the application and a parameter that specifies at least one service provided by the application when executed and at least one state variable for each of the at least one service provided by the executed application for which information of a state change is requested, to the controlled device; and
receiving the second message that represents the state change of the at least one service specified by the parameter, from the controlled device.

23. An event message transmitting method comprising:
receiving a third message that requests a controlled device to install an application and comprises an application parameter representing whether a control point that controls the controlled device via a network is interested in information about the application, from the control point;
transmitting a fourth message including the information about the application according to the application parameter, to the control point;
receiving a first message that comprises a request to execute the application and a parameter that specifies at least one service provided by the application when executed and at least one state variable for each of the at least one service provided by the executed application for which information of a state change is requested, from the control point;
executing the application in response to the receiving the first message; and
transmitting a second message that represents the state change of the least one service specified by the parameter, to the control point.

24. The event message transmitting method of claim 23, wherein the third message further comprises at least one of parameters that represent an address of the controlled device, an address of a device desiring to receive the second message, and a type of the application.

25. The event message transmitting method of claim 24, wherein in the transmitting of the second message to the control point, if state changes occur in a service included in the application, a name of the service and the state change of the service are transmitted as the second message in parallel to the control point and the device desiring to receive the second message.

26. The event message transmitting method of claim 23, wherein in the transmitting of the second message to the control point, if state changes occur in services included in the application, names of the services and the state changes of the services are transmitted as the second message to the control point.

27. The event message transmitting method of claim 23, wherein the network is a Universal Plug and Play (UPnP) based network, and the second message is written in Extensible Markup Language (XML).

28. A non-transitory computer readable recording medium having recorded thereon a program for executing a second message transmitting method comprising:
receiving from a control point, a third message that requests a controlled device to install an application and comprises an application parameter representing whether the control point that controls the controlled device via a network is interested in information about the application;
transmitting a fourth message comprising the information about the application according to the application parameter, to the control point;
receiving a first message that comprises a request to start the application and a parameter that specifies at least one service provided by the application when executed and at least one state variable for each service provided by the executed application for which information of a state change is requested, from the control point,
executing the application in response to the received first message; and
transmitting the second message that represents the state change of the least one service specified by the parameter, to the control point.

29. A control point for controlling a controlled device, the control point comprising:
at least one processor which executes:
an application transmitting unit which transmits an application to the controlled device if the application is desired to be installed in the controlled device;
an application start requesting unit which transmits a first message that comprises a request to execute the application and a parameter that specifies at least one service provided by the application when executed and at least one state variable for each service provided by the executed application for which information of a state change is requested, to the controlled device; and
a second message processing unit which receives from the controlled device a second message that represents the state change of the at least one service specified by the parameter and processes the second message.

30. A controlled device comprising:
at least one processor which executes:
an application installing unit which installs an application received from a control point, in the controlled device;
an application operating unit which receives a first message comprising a request to execute the application and a parameter that specifies at least one service provided by the application when executed and at least one state variable for each service provided by the executed application for which information of a state change is requested, from the control point and operates the application in respect to the received first message; and a second message generating unit to generate a second message that represents the state change of the at least one service specified by the parameter.

31. A control point for controlling a controlled device, the control point comprising:

at least one processor which executes:

an application transmitting unit which transmits to a controlled device, a third message that requests the controlled device to install an application and comprises an application parameter representing whether the control point is interested in information about the application;

an application start requesting unit which receives a fourth message comprising the information about the application according to the application parameter, and transmits a first message that comprises a request to start the application and a parameter that specifies at least one service provided by the application when executed and at least one state variable for each service provided by the executed application for which information of a state change is requested, to the controlled device; and an event message processing unit which receives from the controlled device a second message that represents the state change of the least one service specified by the parameter and process the second message.

32. A controlled device comprising:

at least one processor which executes:

an application installing unit which receives a third message that requests the controlled device to install an application and comprises an application parameter representing whether the control point is interested in information about the application, from the control point;

a service information providing unit which transmits a fourth message comprising the information about the application according to the application parameter to the control point;

an application operating unit which receives a first message that comprises a request to execute the application and a parameter that specifies at least one service provided by the application when executed and at least one state variable for each service provided by the executed application for which information of a state change is requested, from the control point and executes the application; and a second message generating unit which generates a second message that represents the state change of in the least one service specified by the parameter.

33. An event message transmitting method comprising:

receiving a third message that requests a controlled device to install an application and comprises a parameter designating a plurality of devices desiring to receive a state change of an at least one service provided by the application when executed, from a control point that controls the controlled device via a network; and transmitting a second message that represents the state change of the application that occurs during an installation of the application, to the plurality of devices designated by the parameter, wherein the plurality of devices designated by the parameter comprise external devices which take a different communication method from the control point and the controlled device.

34. The event message transmitting method of claim 33, wherein the parameter designates a plurality of groups into which the plurality of devices are divided.

35. The event message transmitting method of claim 34, wherein the transmitting of the second message comprises:

transmitting the second message in parallel to the plurality of groups; and when a transmission of the second message to a device included in at least one of the plurality of groups fails, transmitting the second message to another device included in the at least one group.

36. The event message transmitting method of claim 33, further comprising:

transmitting a fourth message responsive to the third message to the control point;

receiving a first message requesting an operation of the application to start from the control point and performing the operation of the application in response to the first message; and transmitting a second message representing a state change of the application which occurs during an operation of the application, in parallel to the plurality of devices designated by the parameter.

37. The event message transmitting method of claim 33, wherein the network is a Universal Plug and Play (UPnP) based network and the second message is written in an extensible markup language (XML).

38. A non-transitory computer readable recording medium having recorded thereon a program for executing a second message transmitting method comprising:

receiving a third message that requests a controlled device to install an application and comprises a parameter designating a plurality of devices desiring to receive a state change of an at least one service provided by the application when executed, from a control point that controls the controlled device via a network; and transmitting the second message that represents the state change of the application that occurs during an installation of the application, to the plurality of devices designated by the parameter, wherein the plurality of devices designated by the parameter comprise external devices which take a different communication method from the control point and the controlled device.

* * * * *